Aug. 9, 1938.  M. BALZ  2,126,084
SPRINGING ARRANGEMENT FOR THE WHEELS OF POWER DRIVEN VEHICLES
Filed Aug. 29, 1934  2 Sheets-Sheet 1
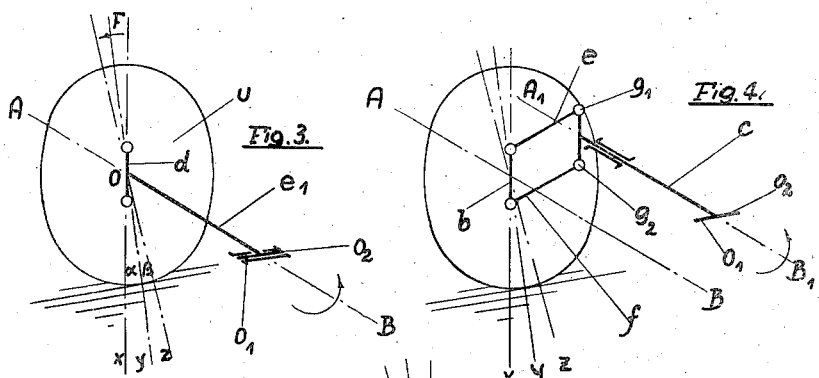
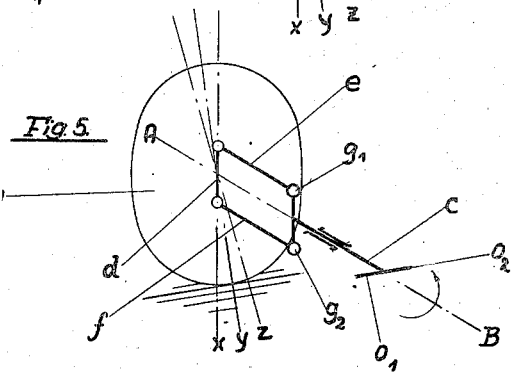
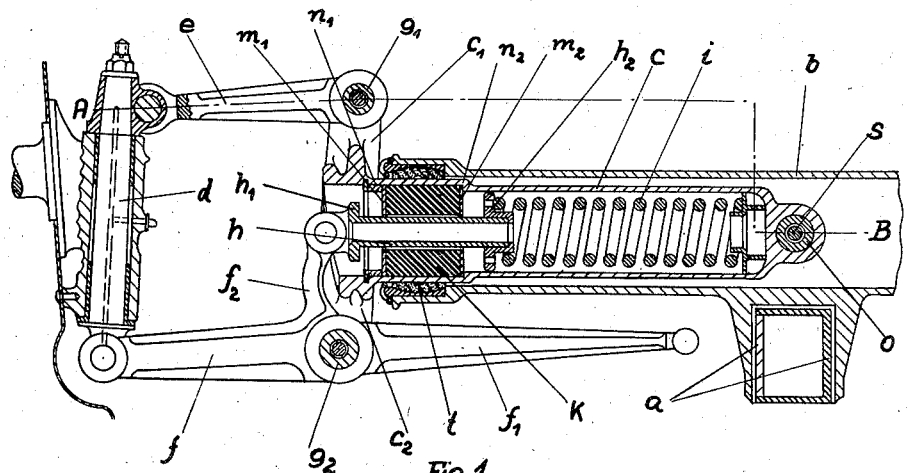
Inventor
Max Balz

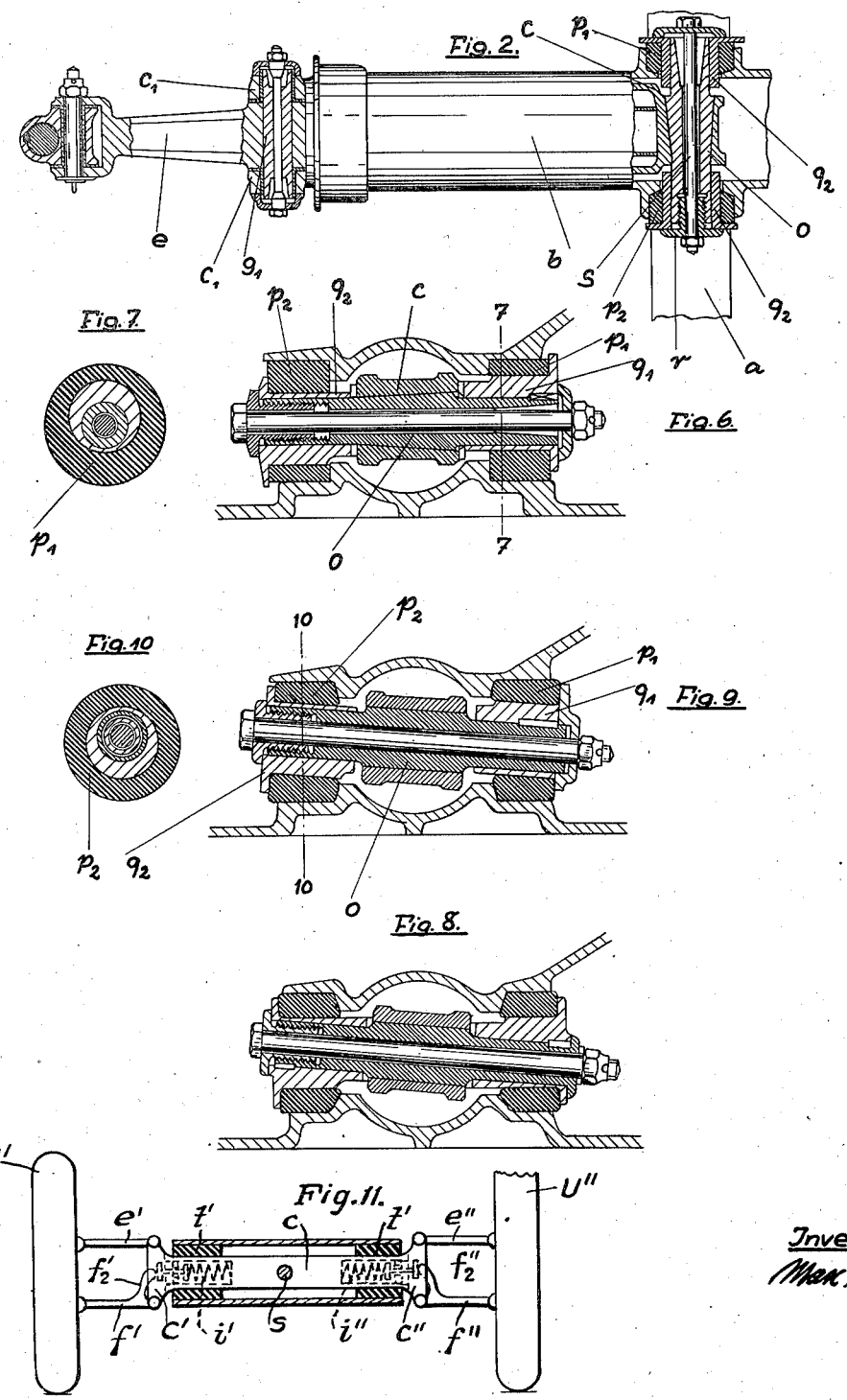

Patented Aug. 9, 1938

2,126,084

UNITED STATES PATENT OFFICE 2,126,084

SPRINGING ARRANGEMENT FOR THE WHEELS OF POWER DRIVEN VEHICLES

Max Balz, Esslingen-on-the-Neckar, Germany, assignor to Daimler-Benz Aktiengesellschaft, Stuttgart-Unterturkheim, Germany Application August 29, 1934, Serial No. 741,992
In Germany September 5, 1933

35 Claims. (Cl. 267—20)

This invention relates to springing systems for independently guided wheels, more particularly for power driven vehicles, in which the guiding members such as half axles, links or leaf springs of a wheel are mounted on a bearing member, which, together with the wheel and the guiding members therefor, is releasably secured to the frame and the invention consists substantially in this that the bearing member is constructed in the form of a rod or a sleeve and is secured in or upon a tubular receiver, more particularly a frame cross member, which is concentric to the bearing member.

The invention further consists in this that the springing which is provided more particularly by means of helical springs is arranged inside a horizontally arranged tubular bearing member and bears at one end against the bearing member and at the other end against one of the guiding members, more particularly in such a manner that on the axle assembly comprising the wheel, the guiding members and the bearing member being removed from the frame, the springing remains inside the axle assembly. The invention further consists in a particularly advantageous construction of this arrangement.

By this means an exceedingly simple assembling and dismounting of the axle assembly with satisfactory and reliable location and securing of the assembly is rendered possible. Further, a very simple and closed exterior is provided.

The invention further consists in an arrangement in which the guiding elements of a wheel, for instance links (more particularly such elements which swing in a transverse plane) are mounted so as to be capable of turning to a certain extent relatively to the frame about an axis extending transversely to the direction of travel, such turning movement being effected against the action of stop members which bear against elastic buffers.

Further, in addition to the torque, the horizontal and vertical jolts are also elastically taken up so that an elastic support of the guiding elements on the frame in all directions is produced. By this means on the one hand an exceedingly soft total springing is obtained, in that all jolts and suddenly applied forces from any direction and of any size can only be transmitted to the frame after being damped and, at the same time, when the invention is applied to steering wheels, shimmying of the front wheels which may also take place under certain circumstances in the case of independent springing is avoided. Further, the axle parts are saved to a very great extent from detrimental action which is particularly noticeable at high speeds of travel.

The invention further comprises means for adjusting the inclination of the wheel or steering swivel pin, more particularly in such a manner that the bearing member which carries the guiding members of the wheel is rotatable about a horizontal axis and can be adjusted in the direction of rotation. Preferably, the adjustment is effected by means of adjustable or exchangeable eccentrics in which the securing pins of the bearing member are mounted and the axis of which extends, more particularly in a plane parallel to the plane of the wheel or in a transverse plane of the vehicle. This adjustment is capable of application to all vehicles but is of particular importance in the case of such vehicles which have to meet with varying travel conditions and (as, for instance, in the case of racing vehicles) must be adjusted in certain circumstances to meet the different driving technique of the individual drivers. This holds good, more particularly also for the adjustment of the inclination of the steering swivel pin in such a manner that the axis of rotation of the steering swivel pin intersects the ground at, or in front of, or behind, the point of contact of the wheel with the ground. In a similar manner the play of the wheel can also be adjusted.

The invention is illustrated, by way of example, in the accompanying drawings, in which Figure 1 is a vertical longitudinal section through a constructional form of the wheel suspension;

Figure 2 is a plan view, partly in section, along the line A—B in Figure 1;

Figure 3 is a diagram showing the adjustment provided by means of the invention in the case of a swinging half axle;

Figure 4 is a similar diagram for the case where the wheel is guided by means of two superposed links which swing in a transverse plane on the vehicle;

Figure 5 is a corresponding diagram for the case of two links swinging in a longitudinal plane of the vehicle;

Figures 6 and 7 show in axial section and in cross-section, respectively, a constructional form of adjusting means having adjustable eccentric mounting;

Figure 8 shows a further constructional form of the eccentric mounting;

Figures 9 and 10 show a further constructional form in longitudinal section and axial section, respectively, of the eccentric mounting.

Figure 11 shows another constructional form of the wheel suspension in axial section.

In Figures 1 and 2, $a$ is a longitudinal girder member of the frame, $b$ is a superposed tubular transverse supporting member which extends outwardly, $c$ is a tubular member mounted inside the tubular transverse member $b$ in the manner hereinafter described, said tubular member being T-shaped at its ends. The cross piece of the T-shaped body is formed by the forks $c_1$ and $c_2$ and serves for supporting the links $e$ and $f$ which carry the steering swivel pin $d$ of the wheel, the said links $e$ and $f$ being pivoted in the forks by means of the pivots $g_1$ and $g_2$. The link $f$ is provided with an arm $f_1$ for the shock absorber and an arm $f_2$ extending upwardly as far as the axis of the tubular member $c$. A short rod $h$ is pivoted to the lever arm $f_2$ and is provided with a stop member $h_1$ and a further stop or abutment $h_2$, which serves at the same time as a spring plate for a helical spring $i$ arranged in the interior of the tubular member $c$ and is of spherical shape on its periphery for guiding it in the internal bore of the tubular member.

Between the stop or abutment members $h_1$ and $h_2$, the rod $h$ is provided with a rubber buffer $k$ which is clamped between metal plates $m_1$ and $m_2$ which bear against the abutment $h_1$ and $h_2$ of the tubular member $c$. When the wheel swings upwardly, then the spring $i$ is compressed until the abutment $h_1$ bears against the plate $m_1$, while, when the wheel swings downwardly, the spring is relieved of load and the abutment $h_2$ bears elastically against the plate $m_2$.

The entire assembly which comprises substantially the wheel, the links $e$ and $f$ together with the tubular member $c$ with the internally situated helical spring $i$ may be inserted as a complete unit horizontally into the tubular transverse member $b$ and removed therefrom again, the spring $i$ being maintained under stress by the buffer $k$ when the unit is removed. For fixing the assembly or preventing it from sliding out only the pin $o$ is required which is pushed through a tapered transverse bore in the end of the tubular transverse member and through openings in the tubular transverse member $b$, being supported in the latter by means of rubber buffers $p_1$ and $p_2$. Spacing sleeves $g_1$ and $g_2$ serve to prevent the rubber buffers $p_1$ and $p_2$ from being excessively stressed during the tightening up of the nut $r$ or the internal bolt $s$. This provision is also of importance because upon the correct initial stressing of the rubber buffer to a certain degree, the tendency of the vehicle to shimmy and the removal of this tendency depends. Further, the tubular member is mounted at its outer end in a rubber ring $t$.

Owing to this manner of mounting the tubular member and with it the entire springing assembly can be turned to a certain extent about the axis of the tubular member $c$, this turning movement being limited by the elasticity of the rubber buffers $p_1$ and $p_2$. In consequence of the elasticity of the buffers $p_1$ and $p_2$ and of the buffer $t$, lateral yielding of the sleeve $c$ in the direction of travel is rendered possible, the connection of the tubular member to the frame by means of the bolt $o$ acting as a universal joint and the amount of movement being substantially limited by the rubber buffer $k$.

Thus the result is obtained of a simultaneous elastic three point suspension of the tubular member $c$, the reaction torque moments set up more particularly by the driving and the braking of the vehicle and the lateral transverse forces being taken up by the rubber buffers $p_1$, $p_2$ and the springing forces acting in the direction of travel and in the vertical direction being taken up simultaneously by the buffers $t$ and $p_1$, $p_2$. The stresses are taken up in a more satisfactory manner, of course, the greater the distance between the rubber buffers $p_1$ and $p_2$ on the one hand and the rubber buffer $t$ on the other hand.

The bearing member $c$ could in certain cases serve for supporting both wheels or the guiding elements therefor of a pair of opposed wheels as shown in Fig. 11, in that for instance when the bearing member is of tubular shape it is elastically secured inside the tubular transverse member.

The adjustment of the wheel is explained with reference to the diagrammatic illustrations, Figures 3 to 5.

In Figure 3, $u$ is the wheel, $d$ the steering swivel pin, $e_1$ the swinging axle connected to the steering swivel pin and connected up to the frame by means of trunnions $o_1$, $o_2$. The wheel rotates about the axis AB which intersects the plane of the wheel at the point O. The axis of the steering swivel pin intersects the ground at the point marked X. If F is the direction of travel and Y the point of contact of the wheel, then the angle $\alpha = \text{XOY}$, that is the forward overhang of the wheel. According to the invention, adjusting means are provided by means of which the steering swivel pin $d$ can be turned about the axis AB so that, for instance, it can take up the position OY or OZ, in which latter case the rearward overhang is given by the angle $\beta$. In order to effect this adjustment, the trunnions $o_1$, $o_2$ may be mounted upon eccentrics or can be journalled in eccentrics by means of which an angular displacement of the trunnions about the axis AB is rendered possible.

In Figure 4, the wheel is guided by means of two links $e$, $f$ which are pivoted on a T-shaped supporting member $c$ which in turn is provided with the pins $o_1$, $o_2$, which can be adjusted about the axis AB (or about an axis substantially parallel thereto) the supporting member being, for instance, turned about its own axis.

In Figure 5, the wheel is likewise guided by two links $e$, $f$ which are pivoted in a similar manner to a supporting member $c$ only in this case the links swing in a longitudinal plane of the vehicle and the adjustment takes place about the parallel axis $A_1$, $B_1$.

In Figures 6 and 7 is shown, by way of example, an arrangement serving for adjusting the pin $o$ which in this case is mounted in eccentrics $q_1$, $q_2$ which are connected by means of keys to the pin, the arrangement being such that the ends of the pin are located at points of opposite eccentricity in the two eccentrics. The eccentrics are mounted in rubber cushions $p_1$, $p_2$. In this case the eccentrics are preferably not rotated for adjusting the steering swivel pin since the rubber would be excessively stressed owing to the eccentricity of the rubber cushions, and in order to avoid this the rubber cushions are exchanged as required.

In the constructional form shown in Figure 8 the axis of the pin extends at an inclination to the axis of the eccentric, otherwise the conditions in this construction are the same as in the case of the previously described example.

In Figures 9 and 10, a constructional form is illustrated also having eccentrics arranged at an inclination. In this case the inclination of the steering swivel pin throughout its entire range of adjustment is effected simply by turning the eccentrics, the deformation of the rubber which takes place being only of very limited extent and being caused solely by the angular adjustment of the axis of the pin with respect to the axis of the rubber cushions. The axis of the eccentrics and the axis of the rubber buffers are substantially coaxial and are only inclined with respect to one another by a certain angle due to the eccentricity of the axis of the pin with respect to the axes of the eccentrics. For adjusting the axis of the pin, both eccentrics $q_1$, $q_2$ or only one thereof may be adjusted. When both eccentrics are simultaneously adjusted this adjustment can be effected independently or in unison but preferably in such a manner that the position of the axis of rotation of the wheel is not altered. Instead of effecting the adjustment by means of eccentrics of course other means may be employed. Further, the invention is capable of application to all kinds of wheel guiding arrangements, for instance also if desired in the case of rigid axle constructions which are suitable therefor.

In Fig. 11 the bearing member $c$ comprises a tube extending from one side to the other of the vehicle and provided at its ends with vertical cross pieces $c'$, $c''$ to which the links $e'$, $f'$ and $e''$, $f''$ are pivoted for guiding the wheels $u'$, $u''$. The springs $i'$, $i''$ are arranged inside the ends of the bearing member $c$ and are acted upon by the lever arms $f_2'$, $f_2''$. The bearing member is supported at the ends by means of rubber buffers $t'$, $t''$ while the transverse pin $s$ serves for taking up the torque. In accordance with the invention the pin $s$ can be elastically secured to the transverse frame member $b$.

What I claim is:—

1. In a vehicle, a frame, a vehicle wheel, springing means for springing the wheel with respect to the frame, a bearing member which substantially does not take part in the springing movement of the wheel, guiding members for independently guiding the vehicle wheel, said guiding members connecting the vehicle wheel to the said bearing member, a single stud-like projection on the bearing member for supporting the bearing member on the frame, a frame member for receiving the bearing member concentric to said projection and means for releasably securing the bearing member to the frame, so that by releasing said securing means the bearing member together with the guiding members for the wheel and the wheel can be removed from the said frame member as a unit simply by withdrawing the bearing member from the frame member surrounding its stud-like projection.

2. In a vehicle, a frame, a vehicle wheel, springing means for springing the wheel with respect to the frame, a bearing member which substantially does not take part in the springing movement of the wheel, guiding members for independently guiding the vehicle wheel, said guiding members connecting the vehicle wheel to the said bearing member, a stud-like projection on the bearing member for supporting the bearing member on the frame, a tubular frame member open at one end in which the bearing member is housed by means of its stud-like projection and means for releasably securing the bearing member to the frame, so that by releasing said securing means the bearing member together with the guiding members for the wheel and the wheel can be removed from the said frame member as a unit.

3. In a vehicle, the combination as set forth in claim 1 with abutment means for the springing means on the bearing member such that the bearing member is removable from the frame together with the springing means.

4. In a vehicle, a frame, a vehicle wheel, an axle assembly for connecting the vehicle wheel to the frame, a transverse pin for connecting the axle assembly to the frame and eccentric bearing members for connecting the transverse pin to the frame, said eccentric bearing members being adjustable in such a manner that the axle assembly can be turned about a horizontal axis.

5. In a vehicle, the combination as set forth in claim 4, in which the axis of the inner bores of the eccentric bearings for receiving the transverse pin is inclined with respect to the axis of the outer bearing surfaces.

6. In a vehicle, a frame, a vehicle wheel, a casing on the frame open at one end, a helical spring in said casing for springing the wheel with respect to the frame, a rubber block having a bore therein at the said end of the casing, said rubber block closing the interior of the casing and isolating the spring from the outside, an actuating rod passed through the bore in the rubber block for transmitting the springing motion of the wheel to the spring and counter abutments on the actuating rod located on either side of the said rubber block for limiting the springing movements of the spring in both directions.

7. In a vehicle, a frame, a vehicle wheel, a wheel carrier, springing means for springing the wheel with respect to the frame, a bearing member, guiding means comprising two superposed link members pivoted at one end to the wheel carrier and at the other end to the bearing member for guiding and suspending the wheel on the bearing member so as to enable the wheel to move relatively to the bearing member during the springing motion of the wheel and elastic bearing means for supporting the bearing member on the frame, so that the bearing member together with the two link members, the wheel carrier and the wheel comprise a unit which is elastically mounted on the frame.

8. In a vehicle, a frame having a tubular frame member, a vehicle wheel, a bearing member having a stud-like projection inserted in said tubular frame member so as to enable the bearing member to be adjusted angularly in said frame member, guiding means for guiding and suspending the wheel on the bearing member so that the wheel can move relatively to the bearing member in a substantially vertical path, and adjustable securing means for fixing the bearing member to the frame in its adjusted angular position so as to permit the bearing member together with the guiding means and the wheel to be adjusted angularly in the said frame member.

9. In a vehicle, a frame, a vehicle wheel, a wheel carrier, a bearing member on the frame capable of angular adjustment thereon around a horizontal axis, two link members for guiding and suspending the wheel on the bearing member, said link members being pivoted one above the other at one end to the wheel carrier and at the other end to the bearing member, securing means for adjustably fixing the bearing member on the frame in its adjusted angular position, so as to permit the bearing member together with the two link members, the wheel carrier and the wheel to be adjusted around the said horizontal axis.

10. In a vehicle, a frame, a vehicle wheel, a bearing member, guiding members for independently guiding the vehicle wheel, said guiding members connecting the vehicle wheel to the said bearing member, a stud-like projection on the bearing member, a frame member for receiving the bearing member concentric to said projection and a transverse pin passed through the stud-like projection substantially perpendicular thereto and connecting the latter to the frame member.

11. In a vehicle, a frame, a vehicle wheel, a bearing member, guiding members for independently guiding the vehicle wheel, said guiding members connecting the vehicle wheel to the said bearing member, a stud-like projection on the bearing member, a frame member for receiving the bearing member, said frame member having a bearing in which the bearing member at one end of the stud-like projection is annularly supported and a transverse pin passed through the stud-like projection substantially perpendicular thereto and connecting the latter to the frame member.

12. In a vehicle, the combination as set forth in claim 2, in which the springing means comprises a helical spring, the bearing member having a bore therein open at one end and extending coaxially with the tubular frame member and into the stud-like projection, the helical spring being housed in said bore so as to be coaxial with the tubular frame member, and comprising means operatively connected to the wheel for transmitting the yielding movements of the wheel to the helical spring.

13. In a vehicle, a frame, a vehicle wheel, a bearing member, guiding members for independently guiding the vehicle wheel connected to the vehicle wheel and bearing member, springing means for springing the wheel with respect to the bearing member and the frame, a stud-like projection on the bearing member for supporting the bearing member on the frame, a frame member for receiving the bearing member concentric to said projection and elastic abutments for elastically opposing any turning movement of the bearing member together with the guiding members for the wheel and the wheel as a unit, within the frame member concentric to the stud-like projection of the bearing member except to a certain small amount.

14. In a vehicle, the combination as set forth in claim 13 with further elastic means for elastically supporting the bearing member on the frame.

15. In a vehicle, a frame, a vehicle wheel, springing means for spring the wheel with respect to the frame, a bearing member which substantially does not take part in the springing movement of the wheel, guiding members for independently guiding the vehicle wheel, said guiding members connecting the vehicle wheel to the said bearing member, a stud-like projection on the bearing member for supporting the bearing member on the frame, a horizontal frame member for receiving the bearing member concentric to said projection, said bearing member being rotatable inside said frame member and elastic abutment means between said frame member and bearing member arranged to elastically oppose rotary motion of the bearing member inside the frame member, so as to enable the bearing member together with the guiding members for the wheel and the wheel to turn to a limited extent as a unit around the axis of said frame member.

16. In a vehicle, a frame, a tubular transverse frame member, a vehicle wheel, a wheel carrier, a bearing member having a stud-like projection by means of which the bearing member can be inserted from the outside into the transverse frame member and secured therein, two links pivoted in superposed relationship at one end to the bearing member and at the other end to the wheel carrier for guiding the vehicle wheel, said bearing member and stud-like projection having an outwardly open cavity and one of the said links having an arm extending opposite the open end of said cavity, a helical spring in the interior of the cavity, abutting at one end against the bearing member and at the other end against the said arm of the link, a rubber buffer for supporting the stud-like projection at the outer end in the transverse frame member, a transverse pin passed through the inner end of the stud-like projection and rubber buffers for supporting said pin in the transverse frame member.

17. In a vehicle, a frame, a vehicle wheel, a bearing member, guiding members for independently guiding the vehicle wheel, said guiding members connecting the vehicle wheel to the said bearing member, a stud-like projection on the bearing member, a frame member for receiving the bearing member concentric to said projection, a transverse pin passed substantially transversely through the stud-like projection of the bearing member, annular rubber buffers for supporting the projecting ends of the transverse pin on the frame member, means for placing the rubber buffers under initial load and stop members for preventing the amount of initial load on the rubber buffers from exceeding a predetermined amount.

18. In a vehicle, a frame, a vehicle wheel, a bearing member, springing means for springing the wheel with respect to the frame, guiding members connected to the vehicle wheel and rotatably connected to the bearing member so as to be capable of swinging transversely to the direction of travel and allowing the springing movement of the wheel with respect to the bearing member, the bearing member being rotatably mounted on the frame so as to be capable together with the said guiding means and the vehicle wheel as a unit, of turning to a limited extent with respect to the frame, independently of the springing movement of the wheel, about a horizontal axis extending transversely to the direction of travel and elastic abutment means arranged between the bearing member and the frame to elastically oppose the rotation of the said unit about said axis.

19. In a vehicle, a frame including a hollow frame member which extends transversely to the direction of travel, a bearing member extending through said hollow frame member, elastic bearing means for supporting the bearing member in said hollow frame member, a vehicle wheel at each end of said hollow frame member, suspending and springing means connected to the bearing member for independently guiding and springing each wheel so as to enable each wheel to swing up and down relatively to the bearing member independently of the other wheel.

20. In a vehicle, a frame including a hollow frame member which extends transversely to the direction of travel, a bearing member extending through said hollow frame member, said bearing member rotatable about its axis in the frame member, elastic supporting means for said bearing member for elastically limiting rotary movement of the bearing member about its axis, a vehicle wheel at each end of said hollow frame member, suspending and springing means connected to the bearing member for independently guiding and springing each wheel so as to enable each wheel to swing up and down relatively to the bearing member independently of the other wheel.

21. In a vehicle, a frame including a hollow frame member which extends transversely to the direction of travel, a bearing member extending through said hollow frame member, said bearing member rotatable about its axis in the frame member, elastic supporting means for said bearing member for elastically limiting rotary movement of the bearing member about its axis, a vehicle wheel at each end of said hollow frame member, springing means for the vehicle wheels and guiding members connected to the bearing member and capable of swinging up and down in transverse planes for independently guiding each wheel so as to enable each wheel to swing up and down relatively to the bearing member independently of the other wheel.

22. In a vehicle, the combination as set forth in claim 20, with a bolt passed transversely through the bearing member and transverse frame member and elastic supporting means interposed between the said pin and the hollow frame member.

23. In a vehicle, a frame, a vehicle wheel, a bearing member, guiding means for independently guiding the vehicle wheel, said guiding means connecting the vehicle wheel to the said bearing member, a stud-like projection on the bearing member for supporting the bearing member on the frame, a frame member for receiving the bearing member concentric to said projection and means for releasably securing the bearing member to the frame so that by releasing said securing means the bearing member together with the guiding means for the wheel and the wheel may be removed from the said frame member as a unit.

24. In a vehicle, a frame, a vehicle wheel, a bearing member, guiding means for independently guiding the vehicle wheel, said guiding means connecting the vehicle wheel to the said bearing member, a stud-like projection on the bearing member for supporting the bearing member on the frame, a tubular frame member open at one end in which the bearing member is housed by means of its stud-like projection and means for releasably securing the bearing member to the frame, so that by releasing said securing means the bearing member together with the guiding means for the wheel and the wheel may be removed from the said frame member as a unit.

25. In a vehicle, a frame, a vehicle wheel, a bearing member, guiding means for independently guiding the vehicle wheel connected to the vehicle wheel and bearing member, a stud-like projection on the bearing member for supporting the bearing member on the frame, a frame member for receiving the bearing member concentric to said projection and elastic abutments for elastically opposing any turning movement of the bearing member together with the guiding means for the wheel and the wheel as a unit, within the frame member concentric to the stud-like projection of the bearing member except to a certain small amount.

26. In a vehicle, a frame, a vehicle wheel, a bearing member, guiding means for independently guiding the vehicle wheel, said guiding means connecting the vehicle wheel to the said bearing member, a stud-like projection on the bearing member for supporting the bearing member on the frame, a horizontal frame member for receiving the bearing member concentric to said projection, said bearing member being rotatable inside said frame member, and elastic abutment means between said frame member and bearing member arranged to elastically oppose rotary motion of the bearing member inside the frame member so as to enable the bearing member together with the guiding means for the wheel and the wheel to turn to a limited extent as a unit, around the axis of said frame member.

27. In a power driven vehicle, a frame, a pair of vehicle wheels, individual bearing members for each of said vehicle wheels, guiding members connecting the vehicle wheels to the respective bearing members and allowing the springing movements of the individual wheels with respect to their bearing members, said bearing members being rotatably mounted on the frame so as to be capable together with the guiding members and the vehicle wheels connected thereto of turning as units independently of one another to a limited extent about horizontal axes with respect to the frame independently of the springing movements of the wheels, and elastic abutment means arranged between the bearing members and the frame to elastically oppose the rotation of the said units about said axes.

28. In a power driven vehicle, a frame, a pair of vehicle wheels, a wheel carrier and a bearing member for each of said wheels, guiding means for guiding and suspending the individual wheel carrier and wheels on the respective bearing members so as to enable the wheels to move relatively to their bearing members and elastic bearing means for elastically supporting the bearing members on opposite sides of the frame so that each bearing member together with the guiding means, the wheel carrier and the wheel comprises a unit which is elastically mounted on the frame.

29. In a vehicle, a frame, a pair of vehicle wheels, bearing members, guiding means connecting the individual vehicle wheels to the respective bearing members and allowing a springing movement of the wheels with respect to their bearing members, said bearing members being rotatably mounted on opposite sides of the frame so as to be capable together with the said guiding means and the wheels connected thereto of turning as units to a limited extent about horizontal axes with respect to the frame independently of one another and independently of the springing movements of the wheels, and elastic abutment means arranged between the bearing members and the frame to elastically oppose the rotation of said units about said axes.

30. In a power driven vehicle, a frame, a pair of vehicle wheels, separate bearing members, one for each wheel, which substantially do not take part in the springing movements of the wheels, guiding members for connecting the vehicle wheels to the respective bearing members, each bearing member having a stud-like projection for supporting the bearing member on the frame, said frame including frame members for receiving each bearing member concentric to said projection, and individual securing means for releasably securing the bearing members to the frame, so that by releasing said securing means the bearing member together with the guiding members for the vehicle wheels and the vehicle wheels can be removed individually from the frame members as units.

31. In a power driven vehicle, a frame, a non-driven vehicle wheel, a bearing member independent of the driving means of the vehicle, which substantially does not take part in the springing movement of the wheel, guiding members for independently guiding the vehicle wheel, said guiding members connecting the vehicle wheel to the said bearing member, a stud-like projection on the bearing member for supporting the bearing member on the frame, a frame member for receiving the bearing member concentric to said projection and means for releasably securing the bearing member to the frame, so that by releasing said securing means the bearing member together with the guiding members for the wheel and the wheel can be removed from the said frame member as a unit.

32. In a power driven vehicle, a frame, a vehicle wheel, a bearing member which substantially does not take part in the springing movement of the wheel, guiding members for independently guiding the vehicle wheel, said guiding members connecting the vehicle wheel to the said bearing member, a stud-like projection on the bearing member for supporting the bearing member on the frame, a bearing support on the side of the frame, adapted to receive concentrically said stud-like projection, so that the bearing member together with the guiding members and the wheel can be pushed on to said bearing support as a unit from the side of the vehicle and means for releasably securing the bearing member to the frame, so that by releasing said securing means, the bearing member together with the guiding members for the wheel and the wheel can be removed from the frame as a unit by being pushed away laterally from said bearing support.

33. In a power driven vehicle, a frame, a vehicle wheel, a helical spring for springing the wheel with respect to the frame, a bearing member which substantially does not take part in the springing movement of the wheel, guiding members for independently guiding the vehicle wheel, said guiding members connecting the vehicle wheel to the said bearing member, a stud-like projection on the bearing member for supporting the bearing member on the frame, the bearing member having a bore therein open at one end and extending into the stud-like projection and the helical spring being housed in said bore, a frame member for receiving the bearing member concentric to said projection, means operatively connected to the guiding members and arranged to coact with the helical spring, so as to permit the wheel to yield only against the action of the spring, and means for releasably securing the bearing member to the frame, so that by releasing said securing means the bearing member together with the guiding members for the wheel can be removed from the said frame member as a unit.

34. In a power driven vehicle, a frame, a vehicle wheel, springing means for springing the wheel with respect to the frame, a bearing member which substantially does not take part in the springing movement of the wheel, said bearing member having a cavity therein, the springing means being housed within said cavity, guiding members for independently guiding the vehicle wheel, said guiding members connecting the vehicle wheel to the said bearing member, a stud-like projection on the bearing member for supporting the bearing member on the frame, a frame member for receiving the bearing member concentric to said projection and means for releasably securing the bearing member to the frame, so that by releasing said securing means the bearing member together with the guiding members for the wheel and the wheel can be removed from the said frame member as a unit, and an abutment for the springing means on said bearing member for retaining the springing means under stress inside the bearing member on the unit being removed from the frame member.

35. In a vehicle, a frame, a pair of vehicle wheels, bearing members, guiding means connecting the individual vehicle wheels to the respective bearing members and allowing a springing movement of the wheels with respect to their bearing members, said bearing members being rotatably mounted on opposite sides of the frame so as to be capable together with the said guiding means and the wheels connected thereto of turning as units to a limited extent about horizontal axes transverse to the direction of travel and extending in a plane passing through the wheel centres with respect to the frame independently of one another and independently of the springing movements of the wheels, and elastic abutment means arranged between the bearing members and the frame to elastically oppose the rotation of said units about said axes.

MAX BALZ.